United States Patent [19]
Jensen

[11] 3,885,240
[45] May 20, 1975

[54] STORAGE RADAR SYSTEM
[75] Inventor: Garold K. Jensen, Alexandria, Va.
[73] Assignee: The United States of America as represented by the Secretary of the Navy, Washington, D.C.
[22] Filed: June 27, 1967
[21] Appl. No.: 649,791

[52] U.S. Cl. ............................ 343/9; 343/5 DP
[51] Int. Cl. .............................. G01s 9/44
[58] Field of Search ............ 343/7.7, 9, 5 DP, 5 SC; 340/173, 166 R, 14

[56] References Cited
UNITED STATES PATENTS

| | | | |
|---|---|---|---|
| 2,591,919 | 4/1952 | Collard | 343/7.7 |
| 2,600,193 | 6/1952 | Bell, Jr. et al. | 343/7.7 |
| 3,127,607 | 3/1964 | Dickey, Jr. | 343/9 X |
| 3,331,061 | 7/1967 | Marcus | 340/173 |
| 3,356,998 | 12/1967 | Kaufman | 340/173 |

Primary Examiner—Maynard R. Wilbur
Assistant Examiner—G. E. Montone
Attorney, Agent, or Firm—R. S. Sciascia; Arthur L. Branning

[57] ABSTRACT

A storage type phase-coherent pulse-doppler radar system wherein the r-f echo pulses are mixed with a coherent frequency (or frequencies) to produce video pulse signals whose amplitude envelope varies with the doppler information and wherein these video pulses are individually stored in a plurality of capacitors. The capacitors are arranged in rectangular matrices with one matrix for each range being investigated. Strobing circuits produce gating pulses to distribute samples of these pulses to their respective storage elements. The stored signals may then be read out at a predetermined rate and analyzed to determine the target's range, range rate, and acceleration.

11 Claims, 7 Drawing Figures

INVENTOR
GAROLD K. JENSEN

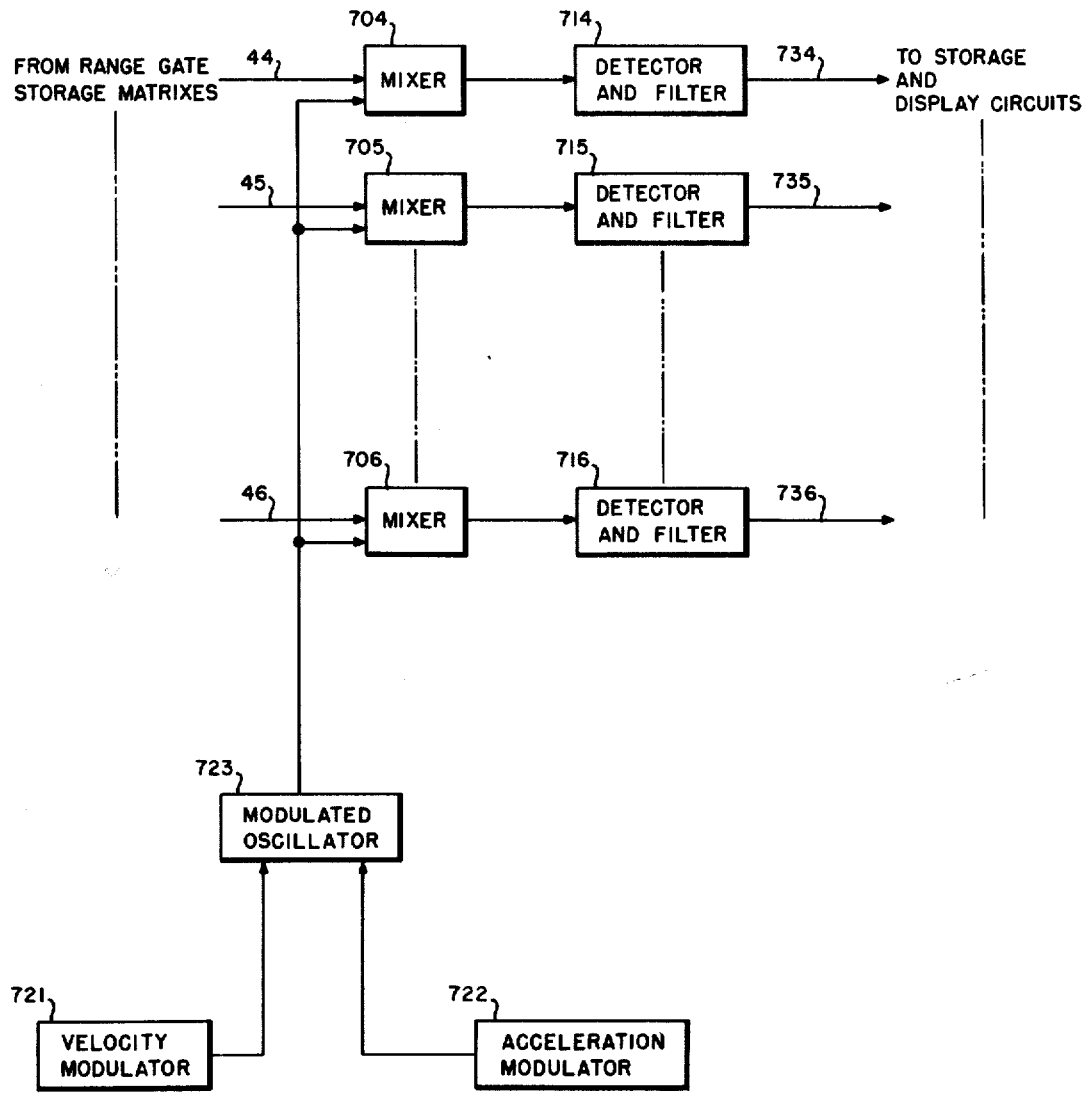

STORAGE RADAR SYSTEM

The invention described herein may be manufactured and used by or for the Government of the United States of America for governmental purposes without the payment of any royalties thereon or therefor.

BACKGROUND OF THE INVENTION

The present invention relates to a radar signal processing system and more particularly to a phase-coherent pulse-doppler radar system wherein a capacitor-type memory matrix is utilized as the storage element.

The problem of detecting aircraft and other airborne targets at great distances has long been of considerable interest for both civilian and military applications and systems have been developed for detecting echo signals appreciably smaller than receiver input noise. For example, U.S. Pat. No. 3,274,594 issued to R. M. Page on Sept. 20, 1966 discloses a signal integrating radar system in which the radio frequency carrier signals (or an intermediate frequency derivative thereof) returned from successively emitted pulses are stored and then played back in rapid succession with a very minimum of time spacing therebetween. Such operation places successive echo pulses in a substantially uninterrupted time sequence and, when this is done with a condition of phase coherence existing between the carrier waves of successive pulses, the effect will be that of lengthening the duration of the pulse and hence reducing the bandwidth required for amplifier reproduction thereof.

A copending application of the present inventor, Ser. No. 53,312, filed Aug. 31, 1960, Object Locator System discloses a further development of a coherent pulse radar system wherein a plurality of returned echoes from a target are stored and then played back in rapid succession. The played back signals are then analyzed to determine their doppler frequencies so that a display showing the target's radial velocity versus its range may be made.

These prior systems have used electronic storage tubes or magnetic drums to carry out the required storage function but each of these devices has certain disadvantages and limitations. Magnetic drums in general have the disadvantages associated with the mechanics of the highspeed drum and its motor or air turbine drive. In addition, the signal linear dynamic range of the recording and readout processes is not as large as the 60 db or better desired. Storage tubes may have a dynamic range greater than that of the magnetic drum but it is still less than desired. In addition, storage tubes have write-read registration problems and may be limited in the number of readout copies they can provide.

SUMMARY OF THE INVENTION

The general purpose of this invention is to provide a radar system which embraces all the advantages of prior art systems and possesses none of the aforedescribed disadvantages.

The present invention achieves a very flexible type of storage radar by using a completely electronic storage system wherein a sample of information derived from each returned pulse is stored on an individual, stationary storage element. Gating signals direct these samples to the proper storage elements and by merely changing these gating signals the mode of operation may be easily changed to conform to a different pulse repetition frequency (prf) and/or a different storage time. The investigation of certain target ranges may be omitted or introduced and the number of successive echoes retained from a single target may be changed electronically.

By using a plurality of stationary storage elements it is possible to make the read-out completely independent of the write-in rate. In this way the desired time compression may be obtained. The order in which the data is read out may be varied and parts or all of the data may be read out more than once.

Before storage occurs the returned r-f pulses are mixed with coherent local frequencies to produce a series of video pulses whose amplitude envelope varies with the doppler frequency. This video signal is sampled at intervals depending upon the range resolution desired and for each originally transmitted pulse a plurality of samples equal in number to the number of range gates are stored. Storage takes place in a plurality of capacitor matrices. The number of matrices is equal to the number of range gates and the number of storage elements in each matrix is equal to the number of signals to be stored for each range gate.

Ring counting circuits with plural outputs are used to sequentially enable the storage elements for write-in and other ring counters are used for sequential read-out.

An object of the invention is the provision of a plurality of stationary storage elements which store sequential samples of a varying signal.

Another object is to provide a plurality of startionary storage elements into which sequential samples of a varying signal may be stored at a given write-in rate and then read out at a different read-out rate.

A further object of the invention is the provision of a matrix of capacitor storage elements which store sequential samples of video signals from a pulse-doppler radar system.

Still another object is to provide a phase-coherent pulse-doppler radar system in which a number of video pulses representing successive echo pulses from a given target range interval are stored individually in an equal number of capacitor storage elements.

Yet another object of the present invention is the provision of a plurality of capacitor matrices, one for each range gate of a pulse-doppler radar system, and means to sequentially store samples of radar video signals in each of the individual storage capacitors of this plurality of capacitor matrices so that this stored information may be read out later for purposes of analysis.

BRIEF DESCRIPTION OF THE DRAWINGS

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 7 shows a diagram of a portion of the analyzer circuits.

DESCRIPTION OF THE PREFERRED EMBODIMENTS

Figure 1:
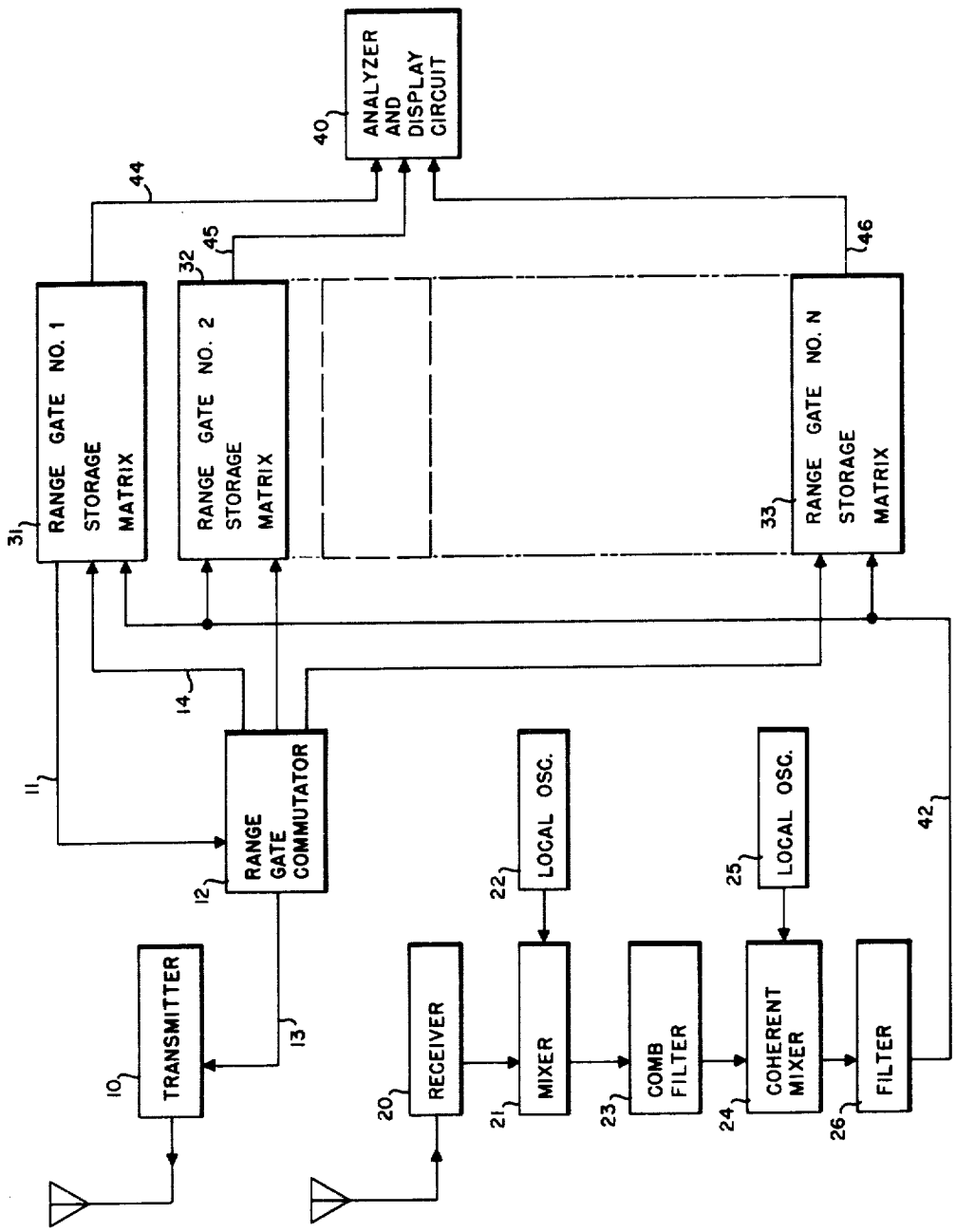
FIG. 1 shows a block diagram of a preferred embodiment of the invention.

A simplified block diagram of a system including the present invention is shown in FIG. 1. It will be understood by those skilled in the art that although separate antennas have been indicated for transmitting and receiving, this is done merely for illustrative purposes and, if desired, a single antenna may be used and connected to the receiver and transmitter through suitable duplexing circuits.

FIG. 1 shows a radar system which is based on the pulse-doppler principle, wherein short phase-coherent pulses of r-f energy are transmitted by transmitter 10 and the echoes are received by receiver 20. In the receiver the returned signals are heterodyned with a continuous stable frequency generated by local oscillator 22. Since the transmitted energy is in the form of a series of r-f pulses spaced at a given pulse repetition frequency, the frequency spectrum consists of a carrier pulse a number of side frequencies on each side of the carrier separated by the pulse repetition frequency and extending as far from the carrier as is necessary to define the transmitted pulse shape. The signal returned from a moving target will also include a similar series of frequencies shifted by an amount equal to the doppler frequency. In addition, the transmitted signal may be refracted by the ionosphere and returned to the ground at some distant point before it is reflected back to the radar receiver. The returned signal is identified as "backscatter" and phenomena associated with the ionosphere cause a modulation of the backscatter at random rates generally of 5 c.p.s. or less. Since targets of interest generally have radial velocities which produce doppler frequencies in excess of 5 c.p.s., a rejection filter of ± 5 c.p.s. width may be placed at each spectral component of the transmitted signal so that the backscatter effects will be removed while the desired moving target information is retained. This type of filtering may be accomplished by comb filter 23 which may be of the type disclosed in U.S. Pat. No. 3,170,120 issued to Garold K. Jensen and James E. McGeogh on Feb. 16, 1965. In the embodiment of FIG. 1 the comb filtering occurs at an intermediate frequency after the returned signals have been heterodyned with a locally generated frequency.

Figure 4:
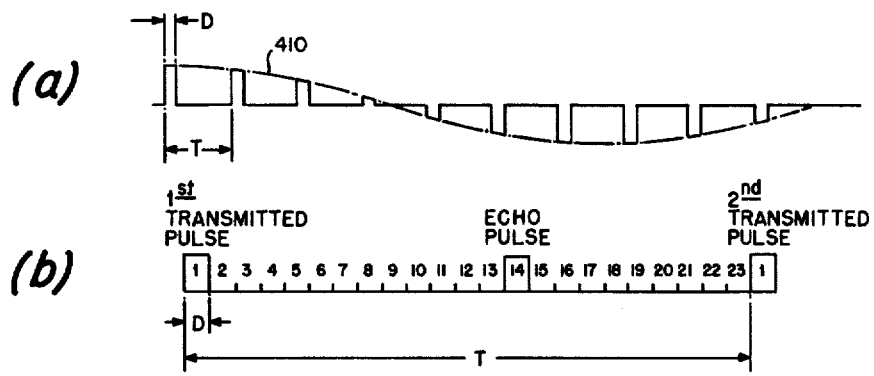
FIG. 4 shows a time diagram of the video pulses present on line 42 in FIG. 1.

After comb filtering, the signal is introduced into coherent mixer 24 which is in the form of a synchronous detector capable of multiplying the output from local oscillator 25 with the output of the comb filter. Both oscillator 22 and oscillator 25 are extremely stable in frequency as well as phase and the sum of their frequencies is equal to the originally transmitted carrier frequency. It is essential that the outputs of the transmitter and both local oscillators remain stable in both phase and frequency so that the synchronous detection process of coherent mixer 24 is able to utilize the instantaneous phase information of the multiplied signals to obtain the desired doppler information. The output of coherent mixer 24 is then passed through low-pass filter 26 whose output will be bipolar video pulses as shown in FIG. 4(a). This figure shows signals derived from successive pulses reflected from a single moving target. These video pulses vary in amplitude and their envelope (shown as dashed line 410) is the doppler frequency imparted to the returned pulses by the moving target. The interval between pulses is the pulse recurrence period (T) of the transmitter, and the duration of the individual pulses is the transmitter pulse duration (D). FIG. 4(b) shows the same signal over the time of a single transmitter period. Here a 23-range-gate structure is shown, with the transmitter pulse occupying the first range gate and the return pulse occupying a position corresponding to the distance of the target. It is usually assumed that range resolution is determined by the pulse duration and in the case shown in FIG. 4 T/D equals 23 so that twenty-three ranges are distinguishable.

The sequence of video pulses energing from filter 26 contains all the information necessary for determining the target's range, range rate, and acceleration. The time positions of the pulses determine range; the instantaneous doppler frequency determines range rate; and the rate of change of the doppler frequency determines acceleration.

The present invention includes a system for storing these video pulses individually on a plurality of capacitors so that they may be later read out for purposes of analysis. The read out rate is usually much higher than the read in rate so that a great amount of time compression is obtained.

Figure 2:
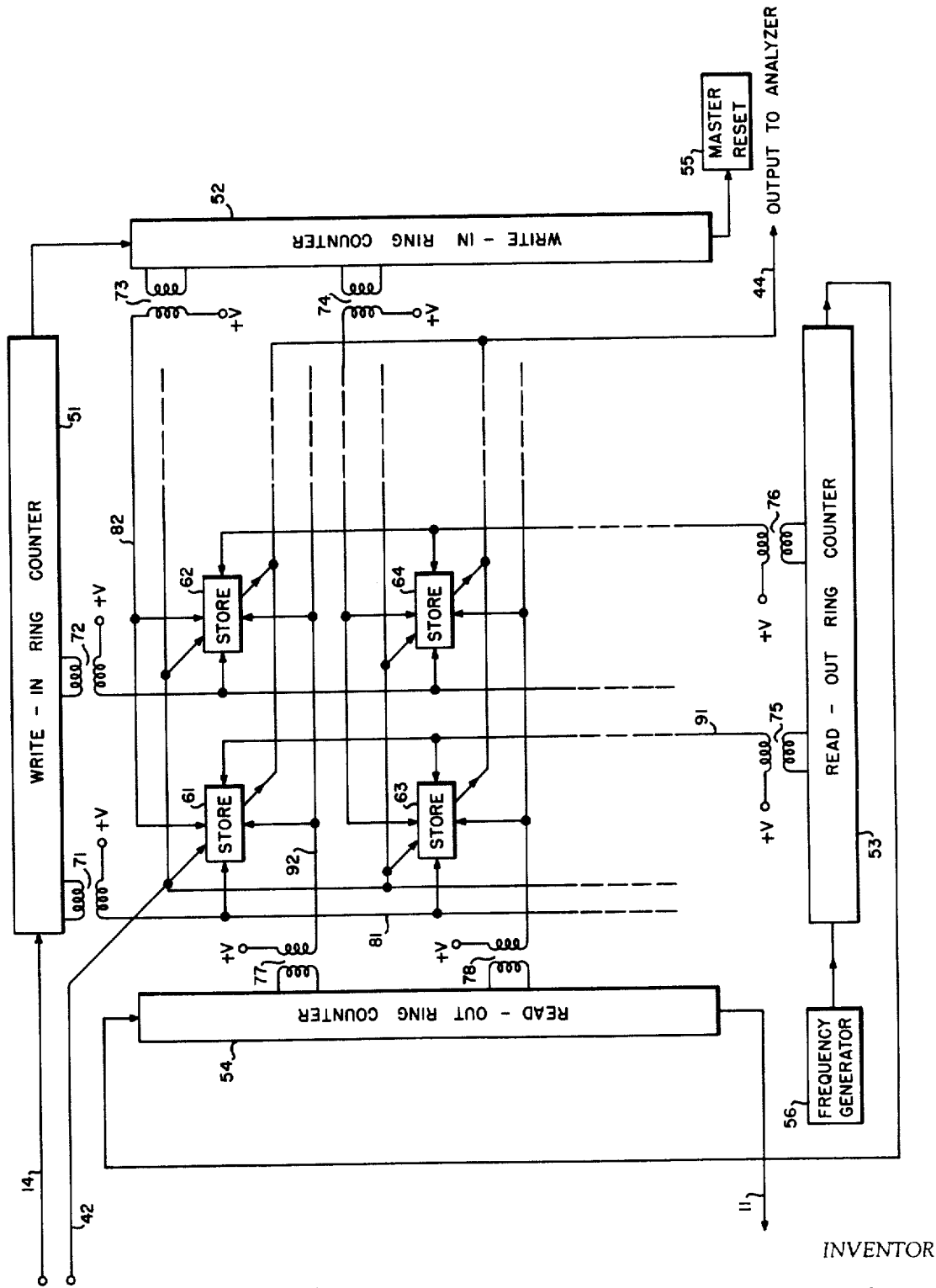
FIG. 2 shows a more detailed diagram of one of the storage matrices shown in FIG. 1.

As shown in FIG. 1 the bipolar video signals are fed in parallel to a plurality range gate storage matrices which are sequentially enabled by range gate commutator 12 for storage during the successive range gate intervals. In reference to FIG. 4(b) and FIG. 1 the target pulse located at range gate 14 would be stored in the fourteenth storage matrix. Each succeeding echo pulse from this target (as long as it remained in the same range interval) would be stored in successive capacitors in the same storage matrix. FIG. 2 shows one example of such a storage matrix. The input video signals appear on line 42 which is connected in parallel to all the individual storage circuits 61, 62, 63, 64, etc. Only one of these storage elements for each matrix is gated for storage at each instant of time, and this selective gating is accomplished by energizing only one horizontal and one vertical drive line (e.g., lines 81 and 82) at each instant. Since it is necessary to sequentially write into each storage element, a systematic strobing device such as the matrix shown in FIG. 2 is efficient.

The range gate storage matrices contain one storage element for each pulse to be stored. Thus, with a prf of 180 and a storage time of 20 seconds, each matrix will contain 3600 storage elements and a 60 by 60 matrix may be used. Once the matrix has been filled the oldest information in storage is continuously replaced by the most recent so that the matrix always maintains the most recent 20-sec sample of information.

Time compression of the data is achieved by reading out the store at a higher rate than write-in. For example, a typical system may have a write-in time of 20 seconds and a read-out time of 241 microseconds to produce a time compression of 82,800 to 1.

Figure 3:
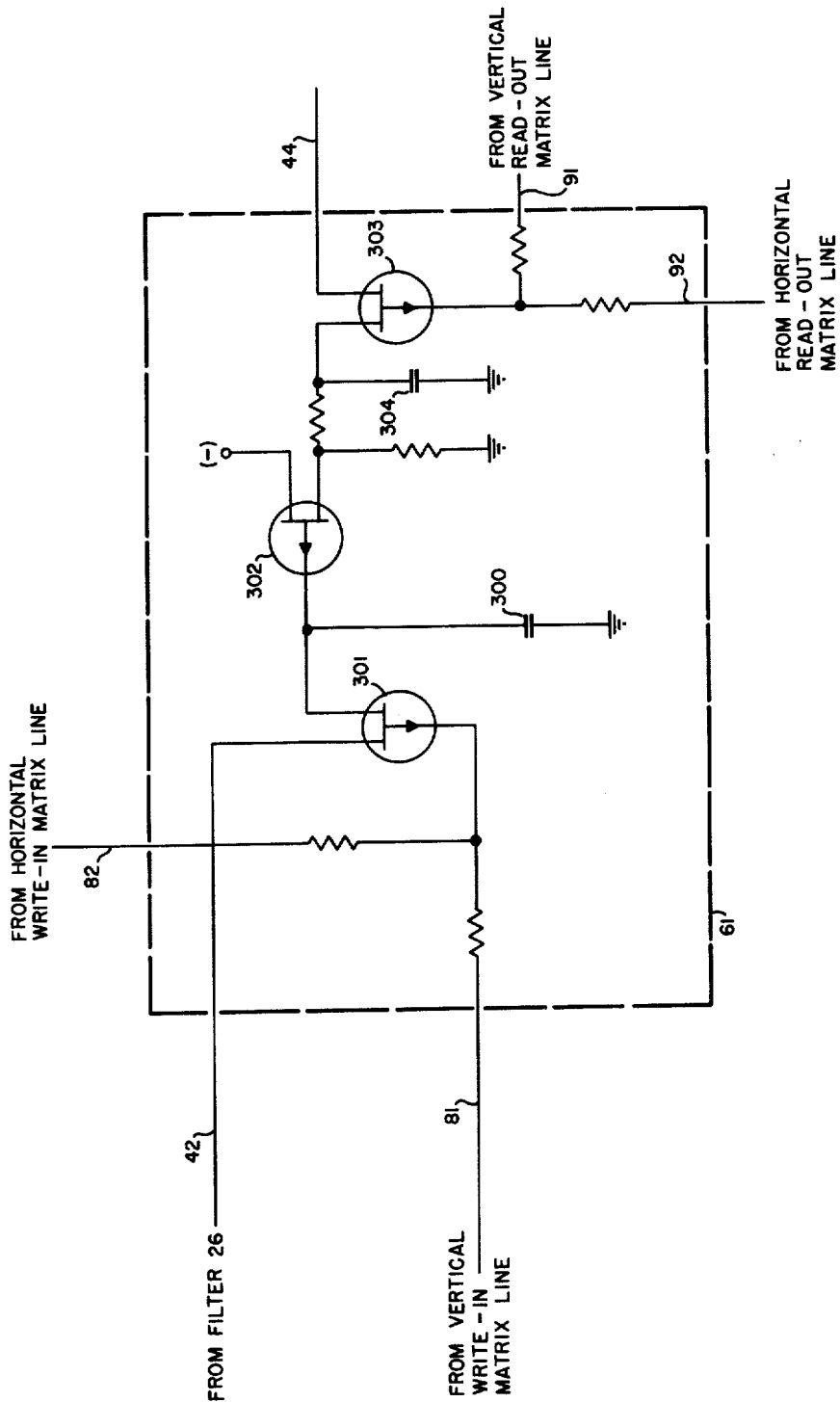
FIG. 3 shows a circuit diagram of a typical storage circuit which could be used in a storage matrix of FIG. 2.

Operation of the storage system is based upon the use of a simple capacitor as the basic storage unit as shown in FIG. 3. This figure shows a typical storage circuit such as store circuit 61 of FIG. 2. Such a circuit includes capacitor 300 which is charged to the write-in signal voltage appearing on line 42 whenever field effect transistor 301 is gated on. This transistor is normally biased off by bias voltages applied to vertical and horizontal grid lines 81 and 82. In order to write into capacitor 300 write gate pulses must appear simultaneously on these two lines. When both write gate pulses are present the storage capacitor can be charged to the signal level appearing on line 42, but when only one pulse or neither pulse is present the charge on the storage capacitor remains undisturbed.

Read-out is accomplished by a similar gating process. Read gate pulses must appear simultaneously on vertical and horizontal grid lines 91 and 92 in order to turn field effect transistor 303 on and allow the signal stored on capacitor 300 to be read out on line 44. In order to non-destructively read out the signal on capacitor 100, field effect transistor 302 is added to provide the necessary isolation between the readout gate and storage capacitor 300.

As explained above the number of storage elements in each matrix depends upon the number of pulse returns from each target range to be stored. Thus, if 180 pulses are transmitted each second and the system has space for storing echoes occurring in a twenty second interval, 3600 individual storage elements are required for each range gate. FIG. 2 shows how these storage elements may be arranged for efficient strobing. The 3600 elements are placed in a 60 by 60 matrix and strobing is produced by a series of flip flops, one for each horizontal and vertical grid line. Write-in ring counter 51 contains sixty of these flip flops for driving the vertical write lines 81, etc. in the matrix while write-in ring 52 also contains sixty flip flops for driving the horizontal write lines 82, etc.

Ring counter 51 causes a pulse to first appear on the left-hand line and then to progressively move, with each input pulse, from line to line across the matrix. When the pulse reaches the last vertical line the ring is reset and the action is repeated. The reset pulse is also fed around the corner to the flip flops down the side in ring counter 52. This ring acts to transfer the write-in position from line to line down the matrix. When the pulse reaches the end of this ring it is used as a master reset for both write-in rings to insure proper over-all strobing.

In the embodiment shown in FIG. 2 the flip flops in the ring counters do not drive the grid lines directly. Instead the outputs of the flip flops control gates which pass a.c. pulses to transformers 71, 72, 73, 74, 75, etc. In this way short gating pulses are obtained on the matrix lines even though the operational period of some of flip flops may be relatively long. Of course, the matrix can be operated without using transformers by applying d.c. signals to the grid lines.

Identical write-in matrices are required for each range gate. The master reset of range gate No. 1, which occurs every 20 seconds, may be used to reset all of the other 22 range matrices to assure in-step strobing.

Pulses occurring at 180 per second for the other range gate matrices are obtained from a divide-by-23 ring counter shown as range gate commutator 12 in FIG. 1. This commutator receives 4140 pps via line 11 from the read-out ring counter in the first matrix and produces 23 separate outputs, each consisting of a 180-pps frequency with pulses offset one range gate width in time from output to output. The pulse output for range gate No. 1 corresponds to the transmission period and may also be employed to key the transmitter via line 13 in FIG. 1.

Ordinarily no separate erase pulse circuit is required to erase the oldest information after 20 seconds since the oldest signal is merely replaced with the newest by means of the sampling circuit. Special erase pulses may be added if desired.

Readout is accomplished with a matrix basically identical to that for write-in. It includes a plurality of vertical and horizontal lines such as lines 91 and 92 in FIG. 2. The primary difference between the readout and the write-in is the speed of operation. In a preferred embodiment the write-in takes place in 20 seconds and the readout takes place in 241 microseconds. This requires an input pulse rate to the read-out flip flops of approximately 15 Mc furnished by frequency generator 56. Read-out ring counters 53 and 54 operate to sequentially strobe the matrix as described for write-in. Also, a master reset taken from the final flip flop of read out ring counter 54 of range gate No. 1 matrix is used to reset all other range gate matrices in order to insure in-step readouts. This master reset pulse from counter 54 occurs at a rate of 4140 pps and is also fed via line 11 to range gate commutator 12 as described above.

Each range gate matrix will be read out over and over again every 241 microsecond period and the output signals may be fed in parallel to analyzer and display circuits 40. A more detailed diagram of the analyzer circuit is shown in FIG. 7 in which the signals from the various range gate matrices arrive on line 44, 45, 46, etc. Each of these signals is a succession of sample pulses whose amplitude envelope varies with the doppler frequency. For targets whose radial velocities are constant the doppler frequencies remain constant but for radially accelerating targets the doppler frequencies will change with time. In order to determine the velocity and acceleration of the targets the doppler frequencies on lines 44, 45, 46, etc. are mixed with a variable frequency from modulated oscillator 723 and only difference frequencies within a specified narrow range are passed and detected by detectors and filters 714, 715, 716, etc. Velocity search is accomplished by stepping the frequency of oscillator 723 uniformly over the span of doppler frequencies. This sequential stepping of the oscillator is brought about by velocity modulator 721. The acceleration search is carried out by sequentially modulating oscillator 723 with a series of acceleration frequency profiles under the control of acceleration modulator 722.

Range information is obtained by noting in which channel the output signal occurred. Velocity data are obtained by noting which velocity step produced the response. Likewise, acceleration data are acquired by observing which acceleration modulation profile produced the matched signal output. The number of acceleration bins (and thus the acceleration resolution) can be increased merely by increasing the number of acceleration profile modulation steps without any significant increase in circuitry. Likewise, the number of velocity bins may be increased by simply adding steps to the modulation waveform. The number of range bins, however, is determined by the number of parallel channels.

The time taken for one complete analysis of the stored data is determined by the number of acceleration and velocity bins and by the speed of the storage system readout. If 100 acceleration bins and 160 velocity bins are required and the storage readout cycle period is 241 microseconds, then one complete analysis cycle of all acceleration, velocity, and range bins will require 3.856 seconds (i.e. 100 × 160 × 241 microseconds). The resulting acceleration, velocity and range information appearing on lines 734, 735 and 736 may then be stored and displayed to its best advantage.

Figure 5:
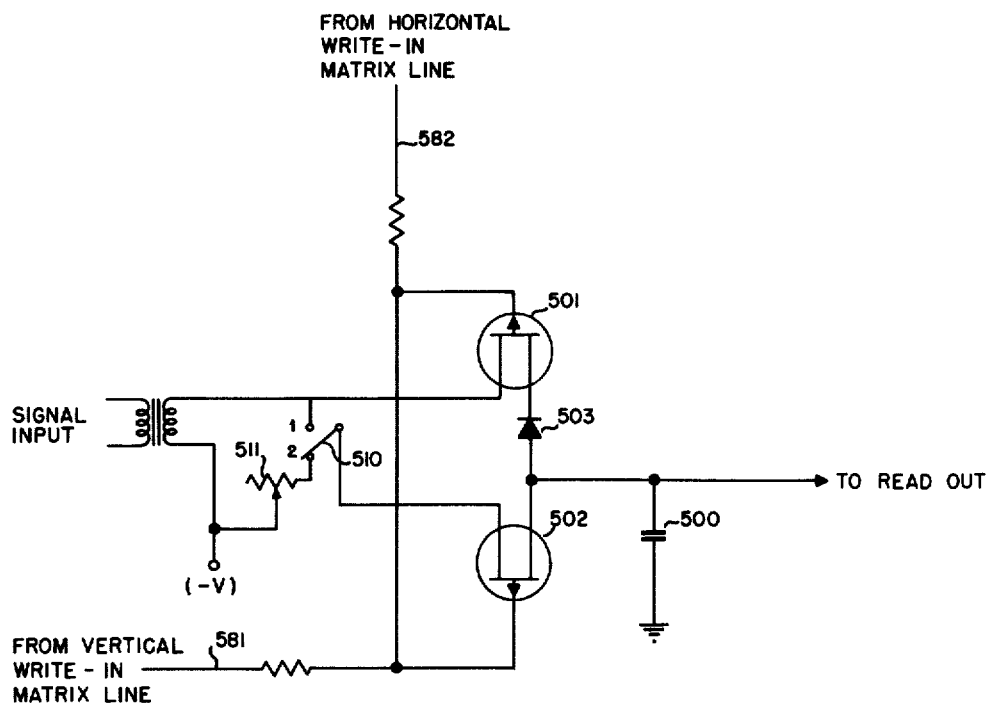
FIG. 5 shows a modified form of a storage circuit which could be used in a storage matrix of FIG. 2.

Other types of storage circuits could be used and FIG. 5 shows a modified circuit which provides for controlled erase of the stored signal. Field effect transistor 501 has the capability of charging storage element 500 but, due to the presence of diode 503, it cannot reduce the charge to agree with a lower level of any subsequent input signal. However, with switch 510 in position 1, transistor 502 permits the charge on capacitor 500 to be reduced to lower levels and, with switch 510 in position 2, controlled erasing with a variable retention time is obtained. The information is erased before each write-in and the retention time (up to several minutes) may be controlled by variable resistor 511.

Figure 6:
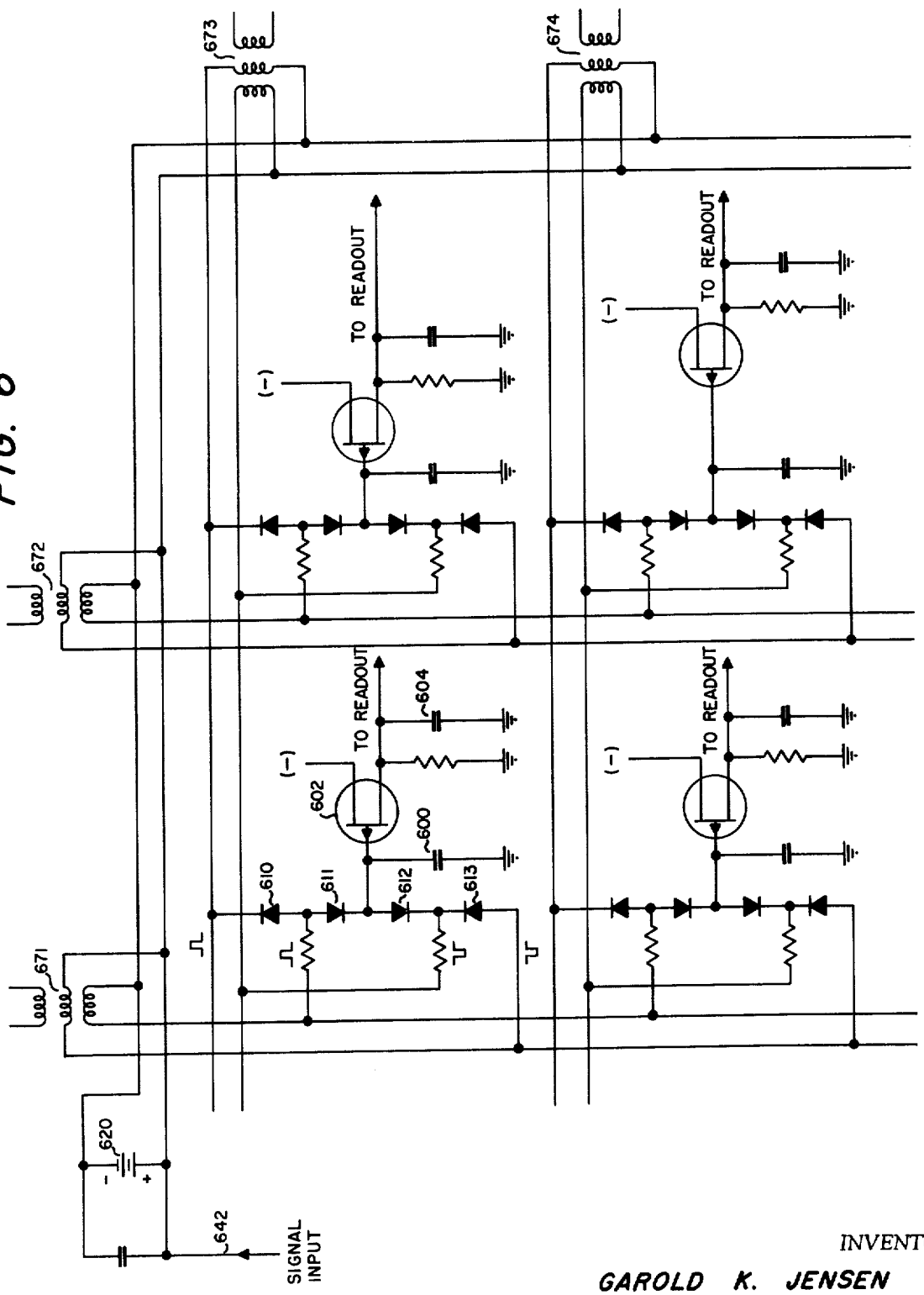
FIG. 6 shows a modified form of a storage matrix using diode gates.

Another modified form of storage circuit is shown in FIG. 6 where diodes instead of transistors are used for gating purposes. In this embodiment both polarities of the gate pulses from the horizontal and vertical ring counters are fed out on the matrix grid. Inhibiting gates are formed at each storage element such as capacitor 600. The gating diodes such as 610, 611, 612, 613 are normally biased off and to charge capacitor 600 to the signal level it is necessary that gating pulses of the proper polarity be applied to cause conduction through the diodes and provide a low impedance path from the signal input to the storage capacitor. The gate pulses are obtained from the secondaries of two pulse transformers such as 671 and 673. One end of each secondary winding is returned to a bypassed bias source which is connected to the input signal line 642. As in the earlier embodiment both horizontal and vertical gating pulses are necessary to allow the input signal to be applied to the storage capacitor. If only one gate pulse is present the charge on the capacitor is undisturbed.

Readout of storage is accomplished with a matrix basically identical to that for write-in but the read-out matrix is not shown in FIG. 6. The capacitance of the output circuit, when switched to a signal storage capacitor and charged to the level of the stored charge, would nibble away a small portion on each read-out. To prevent this action, a field-effect transistor 602 is shown to provide isolation, very high input resistance, and low output resistance (the emitter is bypassed to reduce the rf output impedance).

The above embodiments of the invention have been described as operating with a prf of 180 cps, a range gate width of 241 micorseconds, a storage time of 20 seconds, and a time compression of 82,800 to 1 but the system is very flexible and may be rearranged in many different ways. For example, if only a 10 instead of a 20 second storage time were desirable, only one-half of the storage elements would be required. To accommodate this number on write-in, ring counter 52 (FIG. 2) would be opened at the center and the reset pulses obtained at this point so that only half of the matrix would be strobed per cycle. Since the readout process is completely separate from the write-in process, it may proceed at any desired rate.

The system may also be arranged to operate at other prf's. If the prf is dropped to 90 cps, then the number of samples per range gate will be reduced by a factor of 2 for a given storage time, but the number of range gates will double due to the lengthened interpulse period. This is a fortunate outcome for it means that no extra matrices are required for the additional range gates. One range gate will now require only half the matrix, leaving the other half for a second range gate. If the range interval is considered to be divided into two blocks containing 23 range gates each, then a matrix may be operated so as to contain the No. 1 range gate of the first block in the upper half and the first range gate from block two in the lower half. This may be accomplished by operating the two halves of ring counter 52 in parallel. However, the 180-cps gate pulses to flip flops in this counter must be steered first to one half and then to the other half to insure that the samples occurring at a rate of 180 pps are placed in the correct range gate block. Two gates and a divide-by-two circuit with a 180-pps input are sufficient to perform the steering operation.

With this arrangement the 23 range gates of the first block will be sequentially written into the upper halves of the 23 matrices, and the second block of 23 gates will be written into the lower halves of the matrices. Since each half-matrix must now be strobed at a 90-cps rate, the input of the horizontal flip-flop row must also be changed from 180 to 90 pps, which can be obtained from the divide-by-two circuit. It should be noted that all of the 23 matrices (one for each range gate at 180 pps) are identical and that the few changes necessary to accommodate a 90-pps operation are also identical in each of the 23 matrices.

Still lower pulse repetition rates may be handled by a simple extension of the above techniques. It is also entirely feasible to combine reduced storage time with reduced pulse recurrence operation if desirable.

Another possible mode of operation is to connect the set of 23 matrices to provide over 7 minutes of target track time for a single range gate. The necessary changes are as follows: Since only one range gate is to be processed, the receiver output signal instead of passing ungated to all matrices must first be suitably range gated. Next, because a seven minute storage is required, each of the 23 matrices must be written into in sequence without rewriting occurring until after the seven minute period, assuming a 20 second storage period per matrix and a 180 pulse recurrence rate.

Although only certain specific embodiments of the present invention have been shown and described, it should be understood that there are many possible modifications which can be made without departing from the true spirit of the present invention.

The analyzer and display circuit 40 of FIG. 1 may be constructed in various ways. Detailed descriptions of these circuits may be found in application Ser. No. 650,157 and Ser. No. 649,792 filed concurrently herewith by the present inventor.

What is claimed and desired to be secured by Letters Patent of the United States is:

1. In a moving target detection apparatus, a system for storing a sequence of pulses whose amplitudes vary with the doppler information derived from the moving target, said system comprising:

a plurality of stationary storage elements equal in number to the number of pulses to be stored, write-in means for sequentially gating in said sequence of pulses to be individually stored in said plurality of storage elements, said write-in means comprising a matrix of gating lines requiring simultaneous gating inputs on at least two of said lines to write into a given storage element, and read-out means for sequentially reading out said stored pulses.

2. The system of claim 1, wherein each of said storage elements is a capacitor.

3. The system of claim 1, wherein said read-out means comprises:

a matrix of gating lines requiring simultaneous gating inputs on at least two of said lines to read out of a given storage element.

4. The system of claim 1, wherein said means for reading-out comprises, means for reading-out said information at a speed independent of the speed of write-in.

5. In a pulse doppler radar apparatus in which a plurality of ranges are sampled by means of range gates, a system for storing a sequence of pulses whose amplitudes vary with the doppler information derived from the moving target, said system comprising:

a predetermined number of groups of stationary storage elements equivalent to the number of range gates to be sampled, each of said groups composed of a plurality of said elements;

write-in means for gating target information into a selected number of said elements of each group during each interpulse period;

means for reading out the information stored in each of said groups separately and successively.

6. The system of claim 5 further including means to analyze said readout signals to determine target velocity.

7. The system of claim 5, wherein each of said storage elements is a capacitor.

8. The system of claim 5 wherein said sampling means comprises:

a matrix of gating lines requiring simultaneous gating inputs on at least two of said lines to store a sample in a given storage element.

9. The system of claim 5, wherein said read-out means comprises:

a two dimensional matrix of gating lines requiring simultaneous gating inputs on at least two of said lines to read out of a given storage element.

10. The system of claim 5, wherein said means for reading-out comprises, means for reading-out said information at a speed independent of the speed of write-in.

11. A phase-coherent pulse-doppler radar system comprising:

means to transmit a coherent, pulse r-f signal;

means to receive a doppler shifted pulse echo of said originally transmitted pulse signal;

means to mix said echo signal with an unshifted local signal to produce video pulse signals whose amplitudes vary with the doppler frequency;

a plurality of stationary storage elements equal in number to the number of said video pulses to be stored and interconnected to form a preselected number of groups equal in number to the number of ranges to be sampled;

write-in means for gating information into a selected number of said elements of each of said groups during each interpulse period;

read-out means for gating out information stored in each of said groups separately and successively; and means to analyze said read-out pulses to determine radial velocity and acceleration of a target detected.

* * * * *